Patented Sept. 28, 1948

2,450,367

UNITED STATES PATENT OFFICE

2,450,367

METHOD OF MAKING AMINO-SUBSTITUTED ACRIDINES

Harry James Barber, Gidea Park, England, assignor to May & Baker Limited, Dagenham, England, a British company No Drawing. Application May 9, 1944, Serial No. 534,797. In Great Britain April 6, 1943

7 Claims. (Cl. 260—279)

This invention concerns 5-amino acridine compounds and has for its principal object to provide a process of manufacture of such compounds which is less complicated and more economic than processes hitherto employed.

Compounds of this class, which are technically important, have hitherto usually been made by acting upon the corresponding 5-phenoxy compound (prepared in situ in the form of its hydrochloride) with ammonia or with an organic base in the presence of a large excess of phenol (remaining from the initial stages of forming the 5-phenoxy compound from the corresponding 5-chloro compound). It has also been proposed to prepare 5-amin-acridines by heating a 5-alkoxy-, 5-aryloxy- or 5-aralkoxy-acridine together with an ammonium salt or a salt of an aliphatic amine in the presence of a large excess of phenol. Particularly in the case of the preparation of 5-amino acridine compounds substituted on the amino nitrogen atom by a dialkylamino-alkyl group, the use of a large excess of phenol and the attendant complications are disadvantageous especially when working on a commercial scale. It has, furthermore, been stressed heretofore that anhydrous conditions are necessary.

It has now unexpectedly been found that 5-amino acridine compounds, substituted or unsubstituted on the amino nitrogen atom, can be obtained in the form of salts in excellent yield by causing reaction between a 5-acridyl ether and an ammonium salt or a salt of a primary or secondary amine in the presence of water.

Preferably, the 5-acridyl ether is dissolved in a suitable organic solvent, for example, an alcohol such as ethyl alcohol and the salt dissolved or suspended in water whereupon the two solutions or the solution and suspension respectively, are mixed together. The salt of the desired base frequently separates more or less completely from the reaction mixture at the end of the process and may be removed and purified by suitable means. Alternatively the salt may be isolated by concentration of the solution or by basification may be converted into the free base. While, according to the present invention, the reaction mixture essentially contains water, the reaction medium may be varied widely, e. g. by varying the solvent in which the 5-acridyl ether may be dissolved. The said solvent (preferably a hydroxylic solvent) should be miscible with water to some extent but it need not necessarily be wholly miscible therewith. Thus, it is possible to carry out the reaction with a two-phase system, an example of which is the production of 5-amino-acridine by the treatment of a solution of 5-amyl-oxy-acridine in amyl alcohol with an aqueous solution of ammonium chloride which contains a proportion of ethyl alcohol to facilitate mixing; in order to increase the rate of reaction the mixture is vigorously stirred while being maintained at elevated temperature, for example, at 50° to 60° C. until the reaction has been completed.

Preferably, the reaction mixture is neutral in reaction, or is adjusted to neutrality or it may be on the alkaline side. Reaction under mild acid conditions is not excluded but is less advantageous since acid conditions promote the formation of a by-product viz. the corresponding acridone in varying amount.

Any 5-acridyl ether may be employed in the process of the present invention. Examples of suitable classes of such ethers are alkyl, aryl, alicyclyl and heterocyclyl acridyl ethers. These ethers may carry such nuclear substituents as may be desired in the final product. Specific examples of suitable 5-acridyl ethers are 5-methoxy - acridine, 5 - ethoxy - acridine, 5 - amyloxy-acridine, 5-phenoxy-acridine, 2-chloro-5-ethoxy- 7 - methoxy - acridine, 2 - chloro - 5 - n - butoxy-7 - methoxy - acridine, 2 - chloro - 5 - benzyloxy-7-methoxy-acridine and 2-chloro-5-tetrahydrofurfuryloxy-7-methoxy-acridine.

It will be evident that the salt chosen for use in any particular application of the process will depend upon the basic group which is desired in the 5-position of the final product. For example, if 5-amino acridine (or a 5-amino acridine carrying one or more substituents in the nucleus) is the desired end product, then an ammonium salt is the salt of choice. On the other hand, 5-amino acridine compounds substituted on the amino nitrogen atom may be obtained by the use of a salt of a primary or secondary amine, for example, a salt of a dialkylaminoalkyl-amino compound. Examples of suitable salts are ammonium chloride, ammonium sulphate, ammonium isethionate, methylamine hydrochloride, ethylamine hydrochloride, benzylamine lactate and α-diethylamino-δ-amino-pentane hydrochloride.

While the process of the present invention may be carried out at ordinary temperature it should be noted that the rate of reaction increases with increase in temperature, and in any particular case, the temperature of reaction should be so selected as to provide the desired rate of reaction. Normally it is found that a reaction temperature of 50°–60° C. is satisfactory. It will, of course, be understood that the temperature selected should be related to the stability of the particular salt employed, i. e. it should be below the decomposition temperature of the salt used.

The process of the present invention is illustrated by the following examples:

Example I 5.2 grams of 5-methoxy acridine (Ber. 1935 68, 1455) were dissolved in 60 c. c. of ethyl alcohol and a solution of 1.5 grams of ammonium chloride in 5 c. c. of water was then added. The whole was maintained at 50° C. for 1½ hours when a fine yellow crystalline precipitate of 5-amino acridine hydrochloride separated. After heating for a further few hours to ensure that the reaction had been completed, the reaction mixture was cooled and the product removed in almost theoretical yield. It could be recrystallised from water and was identical with the product obtained by known methods.

Example II 2 grams of 5-methoxy-acridine were dissolved in 37 c. c. of ethyl alcohol and a solution of 0.7 gram of ammonium sulphate in 22 c. c. water added. The mixture was maintained at 50° C. for 8 hours, after which the yellow crystalline product which separated was filtered off and crystallised from boiling water to give 5-amino-acridine sulphate. On treatment with sodium hydroxide it gives 5-amino-acridine base identical with that obtained by known methods.

Example III 2 grams of 5-methoxy-acridine were dissolved in 30 c. c. of ethyl alcohol and treated with a solution of 0.7 gram of methylamine hydrochloride in 7 c. c. of water. The mixture was maintained at 50° C. for 8 hours, after which the yellow crystalline precipitate was filtered off. The latter was dissolved in water and treated with sodium hydroxide, when 5-methylamino-acridine was precipitated. After crystallisation from aqueous alcohol, this has a melting point of 172–4° C.

Example IV 2 grams of 5-methoxy-acridine were dissolved in 30 c. c. of ethyl alcohol and treated with a solution of 1.5 grams of ammonium isethionate in 7 c. c. of water. The resulting solution was maintained at 50° C. for 8 hours. At the end of this period, 150 c. c. acetone were added and the mixture allowed to crystallise, giving 5-amino-acridine isethionate.

Example V 5.5 grams of 2-chloro-5-ethoxy-7-methoxy-acridine (made by treating 2:5-dichloro-7-methoxy-acridine with sodium ethoxide in ethyl alcoholic solution) were dissolved in 90 c. c. of absolute ethyl alcohol and a solution of 5.7 grams of ammonium isethionate in 10 c. c. of water added. The mixture was then maintained at 50–60° C. for 4 hours. After about 1 hour, crystals were deposited, and at the end of the reaction period, these were filtered off, washed with aqueous alcohol and dried in vacuo. The product was 2-chloro-5-amino-7-methoxy-acridine isethionate (M. Pt. 300–8° C. with decomp.). On treatment with sodium hydroxide the corresponding base is obtained (M. Pt. 271° C.).

Example VI 5.5 grams of 2-chloro-5-ethoxy-7-methoxy-acridine were dissolved in 90 c. c. of ethyl alcohol and a solution of 4.4 grams of ethylamine hydrochloride in 10 c. c. of water added. The solution was maintained at 50–60° C. for 4 hours. The crystals which deposited were collected, washed with aqueous ethyl alcohol and dried in vacuo. The product was the hydrochloride of 2-chloro-5-ethylamino-7-methoxy-acridine (M. Pt. 280–2° C. with decomp.).

Example VII 3 grams of 2-chloro-5-n-butoxy-7-methoxy-acridine (prepared by the action of sodium n-butoxide on 2:5-dichloro-7-methoxy-acridine) were dissolved in 90 c. c. of ethyl alcohol and a solution of 4 grams of benzylamine lactate in 10 c. c. of water added. The mixture was maintained at 50° C. for 3–4 hours when the precipitated 2-chloro-5-benzylamino-7-methoxy - acridine lactate (M. Pt. 175–8° C. with decomp.) was filtered off, washed with aqueous alcohol and dried in vacuo.

Example VIII 2 grams of 2-chloro-5-benzyloxy-7-methoxy-acridine (prepared by the action of sodium benzyloxide on 2:5-di-chloro-7-methoxy-acridine) were dissolved in 90 c. c. of ethyl alcohol and a solution of 1.6 grams of ethylamine hydrochloride in 10 c. c. of water added. The mixture was maintained at 50° C. for 3–4 hours when the precipitated 2-chloro-5 - ethylamino - 7 - methoxy-acridine hydrochloride was filtered off, washed with aqueous alcohol and dried in vacuo.

Example IX 2 grams of 2-chloro-5-tetrahydro-furfuryloxy-7-methoxy-acridine (prepared by the action of sodium furfuroxide on 2:5-dichloro-7-methoxy-acridine) were dissolved in 90 c. c. of ethyl alcohol and a solution of 1 gram of ammonium isethionate in 10 c. c. of water added. The mixture is maintained at 50° C. for 3 hours, during which time 2-chloro-5-amino-7-methoxy-acridine isethionate was deposited. This was filtered off, washed with aqueous ethyl alcohol and dried in a steam oven.

Example X 14.4 grams of 2-chloro-5-ethoxy-7-methoxy-acridine were dissolved in 150 c. c. of ethyl alcohol and 12.5 grams of α-diethylamino-δ-aminopentane dihydrochloride added whereupon the mixture was maintained at 50° C. for 8 hours. The acridone which separated was filtered off and 400 c. c. of acetone added to the filtrate to precipitate the 2-chloro-4-(α-methyl-δ-diethyl-amino-butylamino) - 7 - methoxy-acridine dihydrochloride which is identical with the product obtained by known methods.

Example XI

This example illustrates with reference to the production of 5-amino-acridine the carrying out of the process in a two-phase system. The example also illustrates the fact that it is not necessary to isolate the 5-acridyl ether before using it in the present process.

21.3 grams of diphenylamine-2-carboxylic acid were refluxed with excess phosphorus oxychloride for several hours, after which the excess of the latter was removed in vacuo. A solution of 15 grams of metallic sodium in 300 c. c. of anhydrous amyl alcohol was then added to the residue in the flask, cooling if necessary. When the residue was completely dissolved, the solution was kept on a steam bath for an hour, its reaction being maintained alkaline to phenolphthalein. It was then allowed to cool and stirred with a mixture of ice and water for a short time to remove sodium chloride, phosphate, etc. The amyl alcoholic layer containing 5-amyloxyacridine was separated and treated with a solution of 10.6 grams ammonium chloride in 30 c. c. water, 70 c. c. ethyl alcohol being added to facilitate mixing. The mixture was maintained at 50°–60° C. for 5–6 hours with vigorous stirring. At the end of this period, the alcohols were removed by steam distillation. The residue was treated with an equal volume of ethyl alcohol and 10 c. c. hydrochloric acid and cooled in ice. The solid which separated was filtered off, washed with acetone and recrystallised from 5% aqueous alcoholic hydrochloric acid. The product had the characteristics of 5-amino-acridine hydrochloride, prepared by known means.

The term "5-acridyl," as used in this specification, is based on the following position numbering:

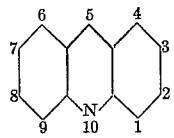

What I claim and desire to secure by Letters Patent is:

1. A process for the manufacture of a 5-amino acridine compound which consists in reacting a 5-acridyl ether with a salt selected from the group consisting of ammonium salts and salts of primary and secondary amines in an aqueous alcoholic reaction medium at elevated temperature below the temperature at which the salt is decomposed, and separating from the reaction mixture the 5-amino acridine salt thus formed.

2. A process for the manufacture of a 5-amino acridine compound which consists in reacting a 5-acridyl ether with a salt selected from the group consisting of ammonium salts and salts of primary and secondary amines in an aqueous alcoholic reaction medium at elevated temperature below the temperature at which the salt is decomposed, separating from the reaction mixture the 5-amino acridine salt thus formed and basifying the product to isolate the corresponding 5-amino acridine compound.

3. A process for the manufacture of a 5-amino acridine compound which consists in reacting a 5-acridyl ether with a salt selected from the group consisting of ammonium salts and salts of primary and secondary amines in an aqueous alcoholic reaction medium having a pH of at least 7 and at elevated temperature below the temperature at which the salt is decomposed, and separating from the reaction mixture the 5-amino acridine salt thus formed.

4. A process for the manufacture of a 5-amino acridine compound which consists in reacting a 5-acridyl ether with a salt selected from the group consisting of ammonium salts and salts of primary and secondary amines in an aqueous alcoholic reaction medium having a pH of at least 7 and at elevated temperature, below the temperature at which the salt is decomposed, separating from the reaction mixture the 5-amino acridine salt thus formed and basifying the product to isolate the corresponding 5-amino acridine compound.

5. A process for the manufacture of a 5-amino acridine compound which consists in reacting a 5-acridyl ether with a salt selected from the group consisting of ammonium salts and salts of primary and secondary amines in an aqueous alcoholic reaction medium having a pH of at least 7 and at a temperature of between 50° and 60° C., separating from the reaction mixture the 5-amino acridine salt thus formed and basifying the product to isolate the corresponding 5-amino acridine compound.

6. A process for the manufacture of a 5-amino acridine compound substituted on the amino nitrogen atom by a dialkylaminoalkyl group which comprises reacting a 5-acridyl ether with a salt of a dialkylaminoalkylamino compound in an aqueous alcoholic solution having a pH value of at least 7 at a temperature of 50° to 60° C. and separating from the reaction mixture the salt thus formed.

7. A process as claimed in claim 6 in which the dialkylaminoalkylamino salt is a salt of α-diethylamino-δ-amino-pentane.

HARRY JAMES BARBER.

REFERENCES CITED

The following references are of record in the file of this patent:

UNITED STATES PATENTS

| Number | Name | Date |
|---|---|---|
| 1,962,277 | Jensch et al. | June 12, 1934 |

FOREIGN PATENTS

| Number | Country | Date |
|---|---|---|
| 571,449 | Germany | Feb. 28, 1933 |

OTHER REFERENCES

Drozdov et al., Chem. Abst., 1936, pages 3432 and 3433.